Aug. 2, 1966 — O. K. DOYLE — 3,263,243
POP-UP VALVE
Filed July 15, 1963 — 2 Sheets-Sheet 1
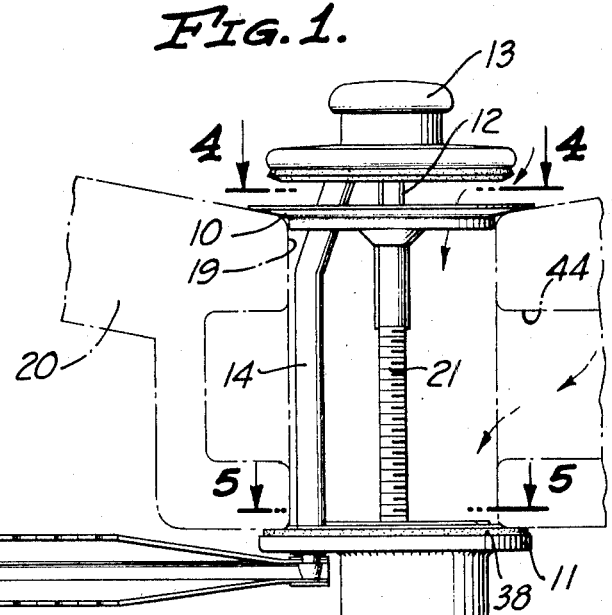
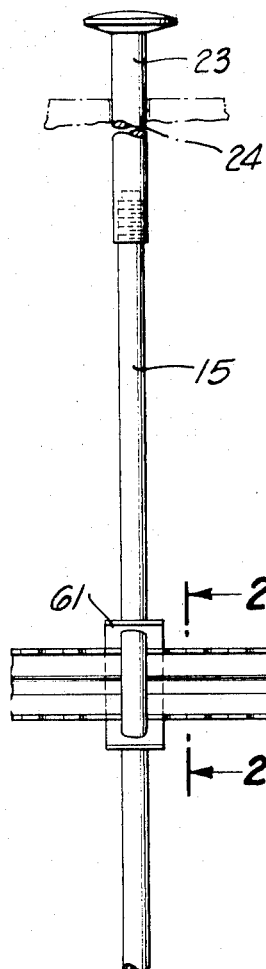
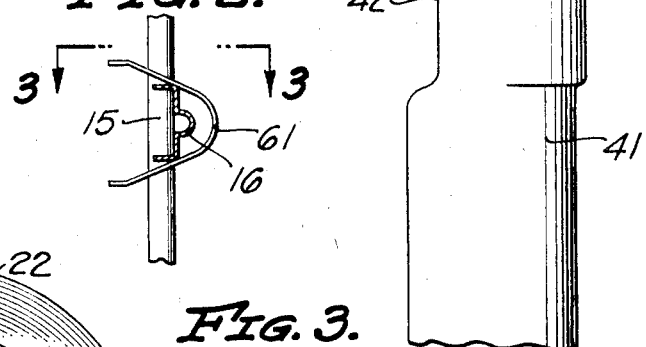
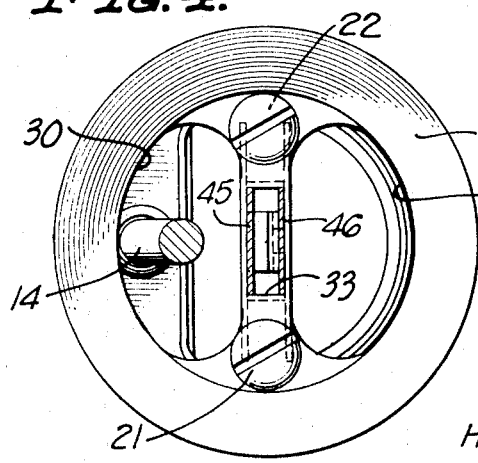
INVENTOR.
ORVILLE K. DOYLE
BY HIS ATTORNEYS
HARRIS, KIECH, RUSSELL & KERN Aug. 2, 1966    O. K. DOYLE    3,263,243
POP-UP VALVE
Filed July 15, 1963    2 Sheets-Sheet 2
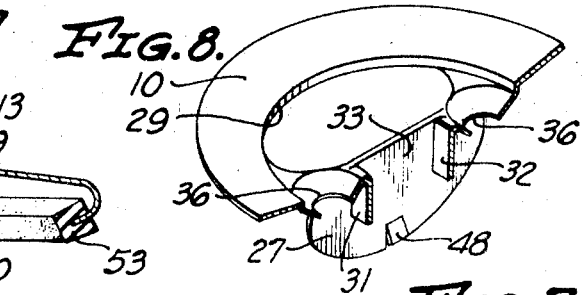
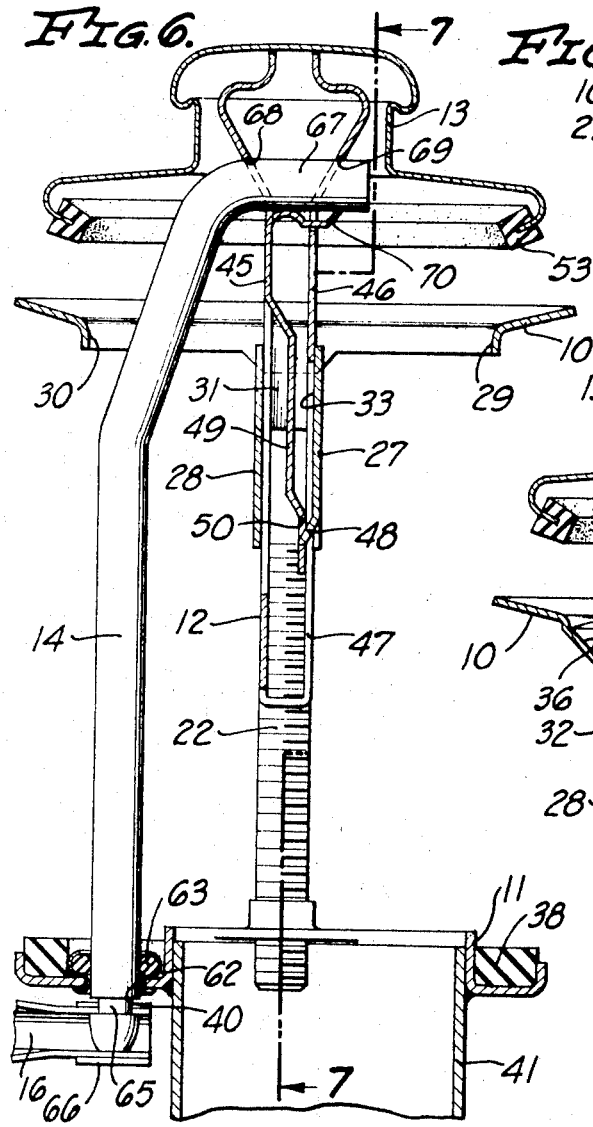
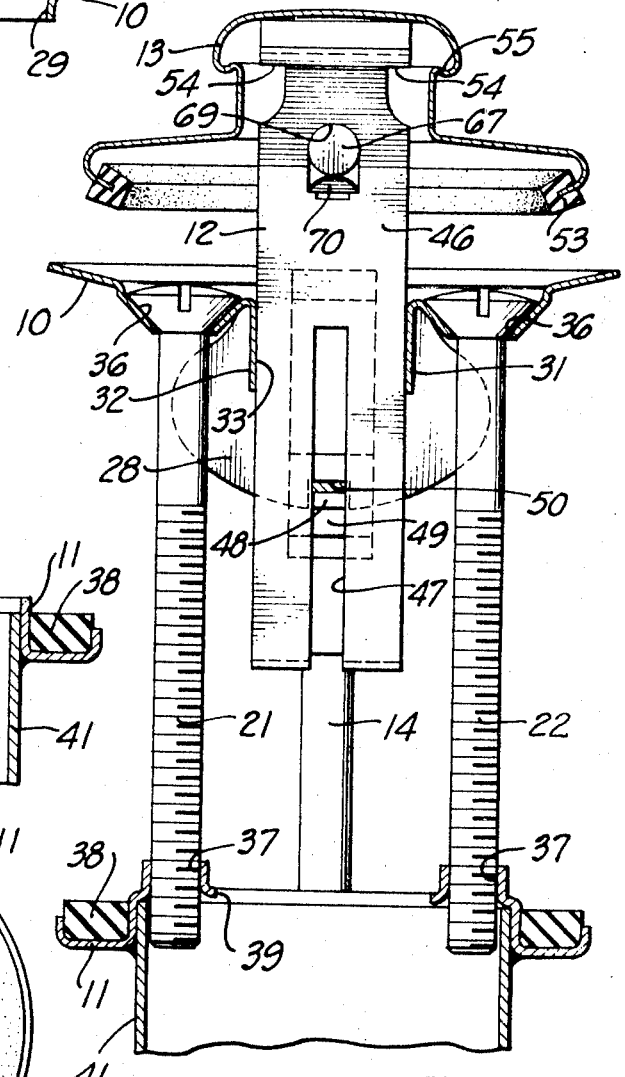
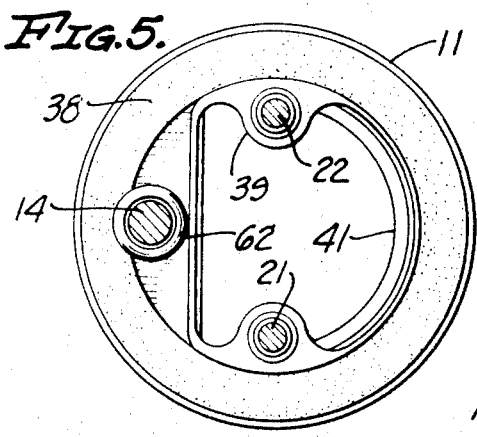
INVENTOR.
ORVILLE K. DOYLE
BY HIS ATTORNEYS
HARRIS, KIECH, RUSSELL & KERN

United States Patent Office 3,263,243
Patented August 2, 1966

3,263,243
POP-UP VALVE
Orville K. Doyle, 1501 E. Commonwealth,
Fullerton, Calif.
Filed July 15, 1963, Ser. No. 294,851
11 Claims. (Cl. 4—203)

This invention relates to valves for the drains of lavatories, tubs and the like and, in particular, to valves of the type that are retained in the drain opening and which are suitable for remote operation. Valves of this general type are sometimes referred to as pop-up valves.

It is an object of the invention to provide a drain valve that is inexpensive, rugged, durable, easy to install and easy to maintain.

It is an object of the invention to provide a drain valve that is remotely operated, manually or otherwise, and one in which the direction of operation of the remote mechanism corresponds to that of the valve, i.e., a downward movement of the remote actuator closes the valve while an upward movement opens the valve.

It is a particular object of the invention to provide a drain valve which may be installed in a lavatory from above without requiring wrenching at the bottom outlet structure or any threaded pipe at the bottom outlet structure. A further object is to provide such a valve having a wide adjustment range permitting installation in lavatories of widely varying thicknesses and with widely varying remote actuator positions.

It is an object of the invention to provide a drain valve for a lavatory or the like in which the structure installed within the drain opening provides a 360° access for the overflow drain to the interior of the valve structure. A further object is to provide such a valve including a latching mechanism for holding the valve in the open position permitting operation of the valve independent of gravity.

It is a particular object of the invention to provide a drain valve suitable for installation in a lavatory or the like which valve structure requires only two seals for complete sealing of the installation.

The invention also comprises novel details of construction and novel combinations and arrangements of parts, which will more fully appear in the course of the following description. The drawings merely show and the description merely describes a preferred embodiment of the present invention which is given by way of illustration or example.

In the drawings:

FIG. 1 is a side view of a preferred form of the invention showing the valve installed with the lavatory in phantom lines;

FIG. 2 is a partial sectional view taken along the line 2—2 of FIG. 1;

FIG. 3 is a partial sectional view taken along the line 3—3 of FIG. 2;

FIG. 4 is a sectional view taken along the line 4—4 of FIG. 1;

FIG. 5 is a sectional view taken along the line 5—5 of FIG. 1;

FIG. 6 is an enlarged sectional view of a portion of the valve of FIG. 1;

FIG. 7 is a sectional view taken along the line 7—7 of FIG. 6; and

FIG. 8 is a perspective view, partly in section, of the upper flange.

The valve includes an upper flange 10, a lower flange 11, a plug carrier 12, a plug 13, a drive shaft 14, and an actuator with a push rod 15 and link 16.

The upper and lower flanges are clamped in a drain opening 19 of a lavatory 20 by screws 21, 22. A knob 23 is threaded onto the upper end of the push rod 15 and slides in an actuator opening 24 of the lavatory.

The upper flange 10 may be stamped from a single piece of sheet metal with members 27, 28 bent down to provide fluid flow openings 29, 30, and with members 31, 32 bent down to define, in conjunction with members 27, 28, a slide opening 33 for the plug carrier 12.

Means are provided for clamping the upper and lower flanges together at the drain opening of the lavatory. Typically this means comprises the screws 21, 22 positioned in openings 36 in the upper flange and engaging threaded openings 37 in the lower flange 11.

A resilient gasket 38 is positioned in an upturned rim of the lower flange 11 for sealing engagement with the lavatory. An outlet opening 39 and a guide opening 40 are provided in the flange 11. An outlet pipe 41 is fitted to the flange 11 at the outlet opening 39, as by welding or brazing. The outlet pipe may be a length of conventional thin-walled metal pipe formed at its upper end to the outline of the outlet opening 39. The upper end of the outlet pipe 41 is preferably offset as at 42 (FIG. 1) to provide clearance for the up and down motion of the drive shaft 14. It should be noted that in the installation of the valve, the lower flange and outlet pipe may be held in position by hand while the clamping screws are tightened from above. No threads are required on the pipe and no wrenches are applied to the pipe during the installation. Hence thinwall pipe may be utilized.

While the main body of the outlet pipe 41 is shown aligned with the centerline of the upper and lower flanges, it should be noted that the outlet pipe could have an eccentric relation with the flange centerline. Such eccentric structure would make alignment with the trap inlet easier in units not utilizing the remote actuator, as such units may be rotated in the lavatory opening.

This installation produces no obstructions in the drain openings between the upper and lower flanges, providing a 360° access between the overflow channel 44 of the lavatory and the outlet through the lower flange.

The plug carrier 12 and the plug 13 may be made as a single unit but preferably are separable as illustrated herein. The plug carrier may be made of a single piece of sheet metal formed into a U-shape with upstanding arms 45, 46 permitting the carrier to slide vertically in the opening 33 of the upper flange 10. A stop clearance slot 47 may be provided in the arm 46 to provide clearance for a stop tab 48 bent inward from the member 27 of the upper flange 10. A tongue 49 may be formed out of the arm 45 with the tongue being bent inward toward the arm 46 and having an opening 50 at the free end thereof.

Upward movement of the plug carrier is limited by engagement of the lower side of the opening 50 with the tab 48, as shown in FIG. 6. The plug carrier can be removed from the upper flange by inserting a suitable tool through the opening 29 of the flange and through the opening 47 of the carrier to engage the tongue 49 below the opening 50, pushing the tongue inward out of engagement with the tab 48. Engagement of the upper edge of the opening 50 with the stop tab 48 provides a temporary support for the plug carrier to normally maintain the carrier in the upper position as shown in FIG. 6. However, a relatively light downward force on the carrier will spring the tongue away from the tab permitting downward movement of the carrier and plug.

The plug 13 preferably carries a resilient gasket 53 at the lower edge thereof for sealing engagement with the upper flange 10 when the plug is moved downward. The plug preferably is mounted on the carrier 12 by a non-rigid connection which permits floating action of the plug to fully engage the gasket with the flange. In the preferred structure illustrated herein, the arms 45, 46 of the plug carrier 12 have outwardly extending shoulders 54 adjacent the upper ends of the arms for engaging an annular rim 55 of the plug. The carrier may be inserted into the plug by manually compressing the arms together. The engagement of the shoulders 54 with the rim 55 prevents direct removal of the plug from the carrier and hence prevents accidental loss of the important plug unit of the valve. However, the plug is easily removed by first exerting a side pressure on the plug to compress the arms of the carrier and then tilting the plug. For example, in the structure of FIG. 6, the plug is first moved to the left and then tilted clockwise.

The valve as described thus far may be installed in a drain opening and actuated by manually gripping the plug 13 without utilizing the drive shaft 14 or the remote actuator. Of course, the guide opening 40 must be plugged if the shaft 14 is not in position.

The remote actuator provides a rigid and positive mechanism for actuating the valve from a remote position, yet one which is readily adjustable for installation in various sizes and shapes of lavatories, tubs, etc. The link 16 is preferably a channel, as shown in FIG. 2, carrying a plurality of notches 60 for receiving the rod 15. A U-shaped spring clip 61 has openings adjacent the ends thereof for receiving the rod 15, with the link 16 being positioned between the rod and the central portion of the clip. When assembled as shown in FIGS. 1, 2 and 3, compression of the clip permits vertical movement of the rod relative to the clip. Horizontal movement of the rod relative to the link is achieved by compressing the clip, removing the rod, sliding the clip along the link to the desired rod position, inserting the rod and releasing the clip.

The valve includes means for sealing the guide opening 40 around the shaft 14. The seal may comprise an annular ring 62 positioned in the opening 40 and an O-ring 63 positioned in the annular ring (FIG. 6). The ring 62 may initially have cylindrical ends with the smaller end being first positioned in the opening 40 and spung over or upset outwardly, after which the O-ring 63 is positioned in the larger end which is then spun over or upset inwardly to provide the S-shaped cross section of the finished product. Alternatively, both ends of the ring may be upset in one operation.

An annular groove 65 may be provided adjacent the lower end of the drive shaft 14 for sliding in a mating notch of the link 16 and a reinforcing clip 66 may be positioned over the link 16 for clamping the shaft in place.

The upper end 67 of the shaft 14 is bent at right angles to the main portion of the shaft and passes through aligned openings 68, 69 of the arms 45, 46 of the plug carrier 12. A tongue 70 may be formed in the arm 45 for resiliently engaging the shaft end 67 to clamp the units together.

In normal operation, the valve is closed by manually pushing down on the knob 23 and is opened by manually pulling up on the knob. Alternatively, the push rod 15 may be automatically operated as by an electrical solenoid, a hydraulic piston, or the like. The corresponding downward movement of the actuator and the plug permits the weight of the actuator to aid the sealing engagement of the plug and upper flange. As indicated previously, the tab 48 and tongue 49 provide a resilient means for holding the plug in the upper or valve open position.

In a modified form, the carrier 12 may be made short relative to the shaft 14, permitting the carrier to be removed upwardly from the opening 33 before the shaft reaches its upper limit of travel. Then the carrier and plug can be moved to one side of the drain opening in the lavatory by rotation of the shaft 14 about its vertical axis, leaving the drain opening clear for cleaning, etc.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a valve for mounting in the drain opening of a lavatory or the like, the combination of:
   an upper flange for positioning at the upper end of the drain opening and including guide members defining a slide opening therethrough;
   a lower flange for positioning at the lower end of the drain opening;
   means for fastening said upper flange to said lower flange for clamping said flanges in place at the drain opening;
   a plug carrier slidably mounted in said slide opening of said upper flange and including a plug at the upper end thereof for engaging said upper flange in sealing relation; and
   a drive member slidably carried in said lower flange and connected to said plug carrier for moving said carrier upward away from said upper flange and downward toward said upper flange as said drive member moves upward and downward respectively.

2. In a valve for mounting in the drain opening of a lavatory or the like, the combination of:
   an upper flange for positioning at the upper end of the drain opening and including vertically extending guide members defining a central slide opening, one of said guide members including stop means projecting into said slide opening;
   a lower flange for positioning at the lower end of the drain opening;
   means for fastening said upper flange to said lower flange for clamping said flanges in place at the drain opening;
   a plug carrier slidably mounted in said slide opening of said upper flange and including first stop engaging means for engaging said upper flange stop means from above for temporarily supporting said carrier in an upper position and second stop engaging means for engaging said upper flange stop means from below for limiting upward motion of said carrier; and
   a plug carried at the upper end of said carrier for engaging said upper flange in sealing relation.

3. In a valve for mounting in the drain opening of a lavatory or the like, the combination of:
   an upper flange for positioning at the upper end of the drain opening and including vertically extending guide members defining a slide opening;
   a lower flange for positioning at the lower end of the drain opening;
   means for fastening said upper flange to said lower flange for clamping said flanges in place at the drain opening;
   a plug carrier slidably mounted in said slide opening of said upper flange and comprising a single U-shaped strip with upwardly extending arms and outwardly directed plug retaining shoulders at the ends thereof; and
   a plug for engaging said upper flange in sealing relation and having an inverted cup-shaped central portion for receiving said plug carrier arms with an annular rim for engaging said plug retaining shoulders, with said carrier arms being compressible toward each other to disengage said plug.

4. In a valve for mounting in the drain opening of a lavatory or the like, the combination of:
   an upper flange for positioning at the upper end of the drain opening and including vertically extending guide members defining a slide opening, fluid flow openings on each side of said slide opening, and a pair of screw receiving openings, one of said guide members including stop means projecting into said slide opening;
   a lower flange for positioning at the lower end of the drain opening and including a pair of threaded openings for fastening said upper flange to said lower flange and clamping said flanges in place at the drain opening by means of a pair of screws passing through the upper flange screw receiving openings and engaging the lower flange threaded openings;

a plug carrier slidably mounted in said slide opening of said upper flange and comprising a single U-shaped strip with upwardly extending arms and outwardly directed plug retaining shoulders at the ends thereof, one arm of said carrier including first stop engaging means for engaging said upper flange stop means from above for temporarily supporting said carrier in an upper position and second stop engaging means for engaging said upper flange stop means from below for limiting upward motion of said carrier; and a plug for engaging said upper flange in sealing relation and having an inverted cup-shaped central portion for receiving said plug carrier arms with an annular rim for engaging said plug retaining shoulders, with said carrier arms being compressible toward each other to disengage said plug.

5. In a valve for mounting in the drain opening of a lavatory or the like, the combination of:

an upper flange for positioning at the upper end of the drain opening and including guide members defining a slide opening therethrough;

a lower flange for positioning at the lower end of the drain opening and having a relatively small guide opening and a relatively large fluid outlet opening;

means for fastening said upper flange to said lower flange for clamping said flanges in place at the drain opening;

a plug carrier slidably mounted in said slide opening of said upper flange and including a plug at the upper end thereof for engaging said upper flange in sealing relation;

a drive shaft slidably disposed in said guide opening and engaging said carrier in driving relation; and means for moving said drive shaft up and down parallel to the axis of the drain opening to respectively open and close said valve.

6. In a valve for mounting in the drain and actuator openings of a lavatory or the like, the combination of:

an upper flange for positioning at the upper end of the drain opening and including guide members defining a slide opening therethrough;

a lower flange for positioning at the lower end of the drain opening and having a relatively small guide opening and a relatively large fluid outlet opening;

means for fastening said upper flange to said lower flange for clamping said flanges in place at the drain opening;

a plug carrier slidably mounted in said slide opening of said upper flange and including a plug at the upper end thereof for engaging said upper flange in sealing relation;

a drive shaft slidably disposed in said guide opening and engaging said carrier in driving relation; and an L-shaped valve actuator having a vertical arm for positioning in the actuator opening and a horizontal arm joined at its end to said drive shaft below said guide opening for moving said drive shaft up and down parallel to the axis of the drain opening to respectively open and close said valve.

7. In a valve for mounting in the drain and actuator openings of a lavatory or the like, the combination of:

an upper flange for positioning at the upper end of the drain opening and including guide members defining a slide opening therethrough;

a lower flange for positioning at the lower end of the drain opening and having a relatively small guide opening and a relatively large fluid outlet opening;

means for fastening said upper flange to said lower flange for clamping said flanges in place at the drain opening;

a plug carrier slidably mounted in said slide opening of said upper flange and including a plug at the upper end thereof for engaging said upper flange in sealing relation;

a drive shaft slidably disposed in said guide opening and engaging said carrier in driving relation;

a vertically disposed push rod for positioning in the actuator opening;

a horizontally disposed connecting link joined at one end to said drive shaft below said guide opening and having a plurality of notches along an edge thereof for receiving said push rod; and a resilient clip engaging said push rod and connecting link for maintaining the rod fixed in a notch of the link.

8. In a valve for mounting in the drain opening of a lavatory or the like, the combination of:

an upper flange for positioning at the upper end of the drain opening and including guide members defining a slide opening therethrough;

a lower flange for positioning at the lower end of the drain opening and having a relatively small guide opening and a relatively large fluid outlet opening;

means for fastening said upper flange to said lower flange for clamping said flanges in place at the drain opening;

a plug carrier slidably mounted in said slide opening of said upper flange and including a plug at the upper end thereof for engaging said upper flange in sealing relation;

an annular ring having an S-shaped cross section with the outwardly opening portion positioned in said guide opening;

a resilient seal ring positioned in the inwardly opening portion of said annular ring;

a drive shaft slidably disposed in said seal ring and engaging said carrier in driving relation; and means for moving said drive shaft up and down parallel to the axis of the drain opening to respectively open and close said valve.

9. In a valve for mounting in the drain and actuator openings of a lavatory or the like, the combination of:

an upper flange for positioning at the upper end of the drain opening and including vertically extending guide members defining a slide opening, fluid flow openings on each side of said slide opening, and a pair of screw receiving openings, one of said guide members including stop means projecting into said slide opening;

a lower flange for positioning at the lower end of the drain opening and including a relatively small guide opening, a relatively large fluid outlet opening, and a pair of threaded openings for fastening said upper flange to said lower flange and clamping said flanges in place at the drain opening by means of a pair of screws passing through the upper flange screw receiving openings and engaging the lower flange threaded openings;

a plug carrier slidably mounted in said slide opening of said upper flange and comprising a single U-shaped strip with upwardly extending arms and outwardly directed plug retaining shoulders at the ends thereof, one arm of said carrier including first stop engaging means for engaging said upper flange stop means from above for temporarily supporting said carrier in an upper position and second stop engaging means for engaging said upper flange stop means from below for limiting upward motion of said carrier;

a plug for engaging said upper flange in sealing relation and having an inverted cup-shaped central portion for receiving said plug carrier arms with an annular rim for engaging said plug retaining shoulders, with said carrier arms being compressible toward each other to disengage said plug;

a drive shaft slidably disposed in said guide opening and engaging said carrier in driving relation;

a downwardly depending outlet pipe fixed to said lower flange at said outlet opening alongside said drive shaft;

a vertically disposed push rod for positioning in the actuator opening;

a horizontally disposed connecting link joined at one end to said drive shaft below said guide opening and having a plurality of notches along an edge thereof for receiving said push rod; and a resilient clip engaging said push rod and connecting link for maintaining the rod fixed in a notch of the link.

10. In a valve for mounting in the drain opening of a lavatory or the like, the combination of:

an upper flange for positioning at the upper end of the drain opening and including guide members defining a slide opening therethrough;

a lower flange for positioning at the lower end of the drain opening and having a relatively large fluid outlet opening and a relatively small guide opening disposed to one side of the drain opening;

means for fastening said upper flange to said lower flange for clamping said flanges in place at the drain opening;

a plug carrier slidably mounted in said slide opening of said upper flange and removable therefrom and including a plug at the upper end thereof for engaging said upper flange in sealing relation when moved downward;

a drive shaft slidably and rotatably disposed in said guide opening and engaging said carrier in driving relation, with said shaft being rotatable when said plug carrier is removed upwardly from said slide opening to displace said plug to one side of the drain opening; and means for moving said drive shaft up and down parallel to the axis of the drain opening to respectively open and close said valve.

11. In a valve for mounting in the drain opening of a lavatory or the like, the combination of:

outlet means including an upper flange for positioning at the upper end of the drain opening, a lower flange for positioning at the lower end of the drain opening, guide members adjacent the upper flange and defining a slide opening therethrough, and means defining a guide opening adjacent the lower flange and disposed to one side of the drain opening;

a plug carrier slidably mounted in said slide opening of said upper flange and removable therefrom and including a plug at the upper end thereof for engaging said upper flange in sealing relation when moved downward;

a drive shaft slidably and rotatably disposed in said guide opening and engaging said carrier in driving relation, with said shaft being rotatable when said plug carrier is removed upwardly from said slide opening to displace said plug to one side of the drain opening; and means for moving said drive shaft up and down parallel to the axis of the drain opening.

References Cited by the Examiner
FOREIGN PATENTS 1,213,686 11/1959 France.
1,255,750 4/1960 France.

LAVERNE D. GEIGER, *Primary Examiner.*

H. GROSS, *Assistant Examiner.*